United States Patent
Pan et al.

(10) Patent No.: US 9,195,267 B2
(45) Date of Patent: Nov. 24, 2015

(54) DOCKING STATION SUITABLE FOR PORTABLE DEVICE

(75) Inventors: Hung-Sung Pan, Taipei (TW); Po-Chin Yu, Taipei (TW); Long-Cheng Chang, Taipei (TW); Ying-Chi Chou, Taipei (TW); Chih-Wei Lu, Taipei (TW); Chun-Liang Wu, Taipei (TW); Chun-Te Shen, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 222 days.

(21) Appl. No.: 13/606,030

(22) Filed: Sep. 7, 2012

(65) Prior Publication Data

US 2013/0111097 A1    May 2, 2013

Related U.S. Application Data

(60) Provisional application No. 61/552,003, filed on Oct. 27, 2011.

(51) Int. Cl.
*G06F 13/00* (2006.01)
*G06F 1/16* (2006.01)

(52) U.S. Cl.
CPC ............ *G06F 1/1632* (2013.01); *G06F 1/1628* (2013.01); *G06F 1/1684* (2013.01); *G06F 1/1616* (2013.01); *G06F 1/1669* (2013.01); *G06F 2200/1633* (2013.01)

(58) Field of Classification Search
USPC ...................................... 710/300–306, 62–64
See application file for complete search history.

(56) References Cited

U.S. PATENT DOCUMENTS

| 7,480,138 | B2 * | 1/2009 | Kogan et al. ............. 361/679.02 |
| 7,532,461 | B2 * | 5/2009 | Krancher et al. ........ 361/679.41 |
| 7,778,023 | B1 * | 8/2010 | Mohoney ................. 361/679.41 |
| 2004/0090742 | A1 * | 5/2004 | Son et al. ...................... 361/686 |
| 2004/0174671 | A1 * | 9/2004 | Huang et al. .................. 361/683 |

(Continued)

FOREIGN PATENT DOCUMENTS

| CN | 1499393 | 5/2004 |
| TW | 581286 | 3/2004 |

(Continued)

OTHER PUBLICATIONS

"Office Action of Taiwan Counterpart Application", issued on Dec. 23, 2014, p. 1-p. 9.

*Primary Examiner* — Raymond Phan
(74) *Attorney, Agent, or Firm* — Jianq Chyun IP Office

(57) ABSTRACT

A docking station suitable for a portable device is provided. The docking station includes a base, a pivot assembly, a supporting board and an electrical connection module. The base includes a circuit board, wherein the circuit board has a ring-shaped circuit. The pivot assembly is pivotally connected to the base along a first axis. The supporting board is connected to the pivot assembly and adapted to support the portable device. The supporting board is rotated relative to the base when the pivot assembly is rotated along the first axis. The electrical connection module includes an electrical connection component and a plurality of connecting terminals. The electrical connection component is fixed on the pivot assembly and contacted with the ring-shaped circuit. The connecting terminals are fixed on the pivot assembly and connected to the electrical connection component. The portable device is adapted to be connected to the connecting terminals.

23 Claims, 10 Drawing Sheets

(56) References Cited

U.S. PATENT DOCUMENTS

2007/0073952 A1* 3/2007 Tsai et al. .................... 710/303
2011/0261509 A1* 10/2011 Xu et al. ................... 361/679.01
2013/0086293 A1* 4/2013 Bosse et al. ................... 710/303
2013/0176673 A1* 7/2013 Yen et al. ................. 361/679.26

FOREIGN PATENT DOCUMENTS

| TW | 200917049 | 4/2009 |
| TW | M366283 | 10/2009 |
| TW | I347507 | 8/2011 |

* cited by examiner

DOCKING STATION SUITABLE FOR PORTABLE DEVICE

CROSS-REFERENCE TO RELATED APPLICATION

This application claims the priority benefits of U.S. provisional application Ser. No. 61/552,003, filed on Oct. 27, 2011. The entirety of the above-mentioned patent application is hereby incorporated by reference herein and made a part of this specification.

BACKGROUND OF THE INVENTION

1. Field of the Invention

The invention relates to a docking station, and more particularly, the invention relates to a docking station suitable for a portable device.

2. Description of Related Art

With the rapid developments in technology, portable devices such as tablet computers or smart phones are used extensively because portable devices obtain advantages such as carry-on sizes and simple operations. Currently, many portable devices do not have supporting bases. Users operate portable electronic devices in a way of holding with hands, causing burden to users when operating the devices for a long time.

Accordingly, portable devices and docking stations are collocated with each other in contemporary designs. The docking station has functions of storing and charging portable devices. Some docking stations further contain keyboard modules for users to input function. Conventionally, docking stations are usually designed for disposing portable devices only at a single position and therefore users cannot change dispositions and facing directions of portable devices on docking stations based on their using habits or various usage patterns. The conventional designs lack flexibility and convenience when portable devices are used in collocation with docking stations. For that reason, design approaches for docking stations of portable devices still require improvements.

SUMMARY OF THE INVENTION

The invention provides a docking station to enhance flexibility and convenience when used in collocation with a portable device.

The invention provides a docking station suitable for a portable device. The docking station includes a base, a pivot assembly, a supporting board and an electrical connection module. The base includes a circuit board, wherein the circuit board has a ring-shaped circuit. The pivot assembly is connected pivotally to the base along a first axis. The supporting board is connected to the pivot assembly and adapted to support the portable device. The supporting board is rotated relative to the base when the pivot assembly is rotated along the first axis. The electrical connection module includes an electrical connection component and a plurality of connecting terminals. The electrical connection component is fixed on the pivot assembly and contacted with the ring-shaped circuit. The connecting terminals are fixed on the pivot assembly and connected to the electrical connection component. The portable device is adapted to be connected to the connecting terminals.

In an embodiment of the invention, the supporting board is pivotally connected to the pivot assembly along a second axis. The base includes a bottom plate and a moving plate. The docking station further includes an elastic element supported between the bottom plate and the moving plate and pushing the moving plate against the supporting board to fix the supporting board at a first position. When the supporting board is rotated along the second axis, the supporting board pushes the moving plate and moves from the first position to a second position by resisting elastic forces of the elastic element.

In an embodiment of the invention, when the supporting board pushes the moving plate, the moving plate is moved relative to the bottom plate via elastic deformation of the base.

In an embodiment of the invention, the electrical connection component is a pogo connector and has a plurality of pogo pins.

In an embodiment of the invention, the pivot assembly has a bottom cap having a plurality of holes. The pogo pins are contacted with the ring-shaped circuit.

In an embodiment of the invention, the pivot assembly includes a pivot element and an assembly element. The pivot element is pivotally connected to the supporting board. The pivot element and the assembling element are respectively located on opposite sides of the circuit board. The circuit board has an aperture and the assembling element is fixed together with the pivot element through the aperture.

In an embodiment of the invention, the pivot assembly includes a sleeve covering the pivot element, the electrical connection component and the connecting terminals.

In an embodiment of the invention, the pivot assembly includes a position-limiting element fixed on the base and restricting a position of the sleeve on the base.

The invention provides a docking station suitable for a portable device. The docking station includes a base, a pivot assembly, a supporting board and an elastic element. The base includes a bottom plate and a moving plate. The pivot assembly is connected pivotally to the base along a first axis. The supporting board is connected pivotally to the pivot assembly along a second axis and adapted to support the portable device. When the supporting board is at a first position, the pivot assembly is rotated along the first axis for the supporting board to rotate relative to the base. When the supporting board is rotated along the second axis, the supporting board pushes the moving plate and moves from the first position to a second position.

In an embodiment of the invention, the docking station further includes an elastic element supported between the bottom plate and the moving plate and pushing the moving plate against the supporting board to fix the supporting board at the first position. When the supporting board is rotated along the second axis, the supporting board pushes the moving plate and moves from the first position to a second position by resisting elastic forces of the elastic element.

In an embodiment of the invention, the elastic element is a compression spring and is telescoped on the pivot assembly.

In an embodiment of the invention, the bottom plate has a slot. The moving plate is pivotally disposed at one side of the slot. The supporting board pushes the moving plate and moves from the first position to the second position when the supporting board is rotated along the second axis In an embodiment of the invention, when the supporting board pushes the moving plate, the moving plate is pivotally rotated such that the supporting board is partially located in the slot.

In an embodiment of the invention, the base has an input interface.

In an embodiment of the invention, when the pivot assembly is rotated along the first axis, the supporting board is rotated relative to the base and drives the portable device facing forward or backward to the input interface.

In an embodiment of the invention, when the supporting board is located at the first position, the supporting board and the portable device are expanded from the base and when the supporting board is located at the second position, the supporting board and the portable device are closed on the base.

In an embodiment of the invention, when the supporting board pushes the moving plate, the moving plate is moved relative to the bottom plate via elastic deformation of the base.

In an embodiment of the invention, the moving plate has an opening. The pivot assembly is pivotally connected to the bottom plate and protruded from the opening.

In view of the foregoing, the pivot assembly of the invention is connected pivotally to the base and the supporting board is pivotally connected to the pivot assembly, enabling the supporting board to rotate to a plurality of different positions with respect to the base. By doing so, the portable device on the supporting board can adopt to various habits or usages of various users by rotations of the supporting board, and enhances flexibility and convenience of the portable device used in collocation with the docking station. In addition, an electrical connection component is disposed on the pivot assembly, wherein the electrical connection component is adapted to be contacted with a ring-shaped circuit of the base, and electrically connected to the portable device on the supporting board via connecting terminals. Herewith, when the supporting board and the pivot assembly are rotated relative to the base along the first axis, the electrical connection component following the pivot assembly is rotated relative to the ring-shaped circuit along the first axis and at the same time continues to contact with the ring-shaped circuit to sustain electrical connection between the portable device and the base. In addition, the moving plate of the base pushes against the supporting board to fix a position of the supporting board, enabling the portable device to be disposed steadily on the supporting board. All users need to do is to apply forces to the supporting board and make it push the moving plate so that the supporting board is rotated relative to the base along the second axis. So it is more convenient to use the said item.

In order to make the aforementioned features and advantages of the invention more comprehensible, embodiments accompanying figures are described in details below.

DESCRIPTION OF EMBODIMENTS

Figure 1:
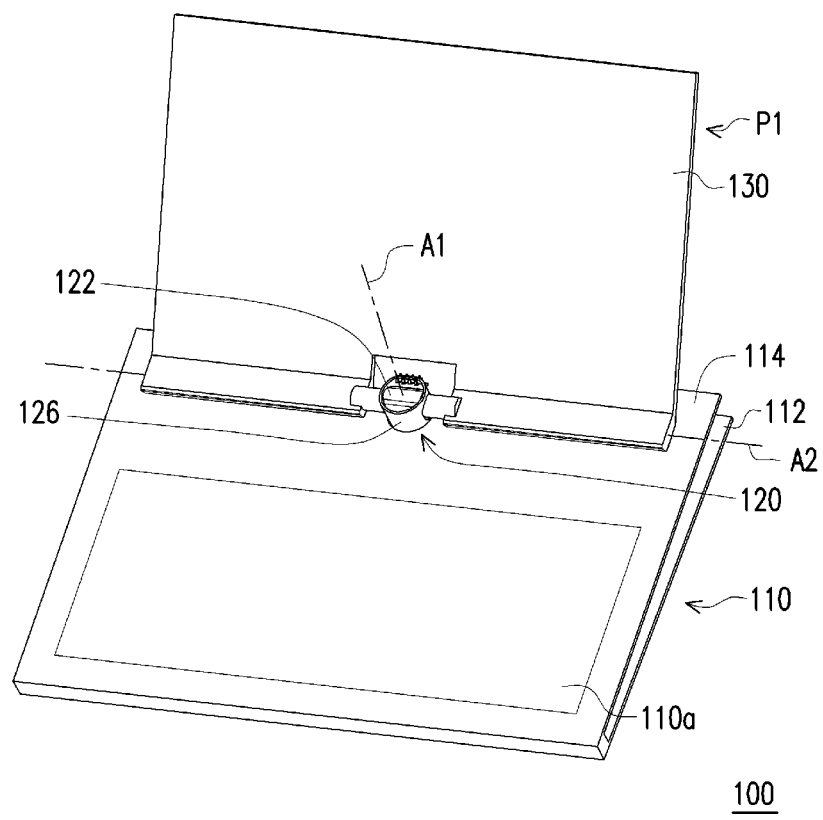
FIG. 1 is a three-dimensional view of a docking station according to an embodiment of the invention.
Figure 2:
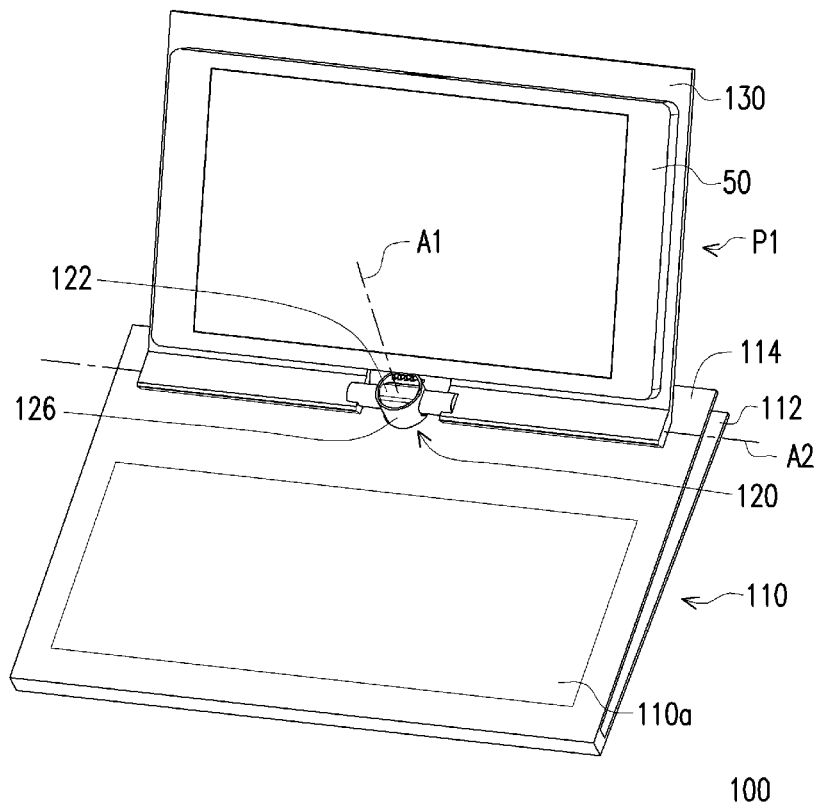
FIG. 2 is a schematic view of the docking station collocated with a portable device of FIG. 1.
Figure 3:
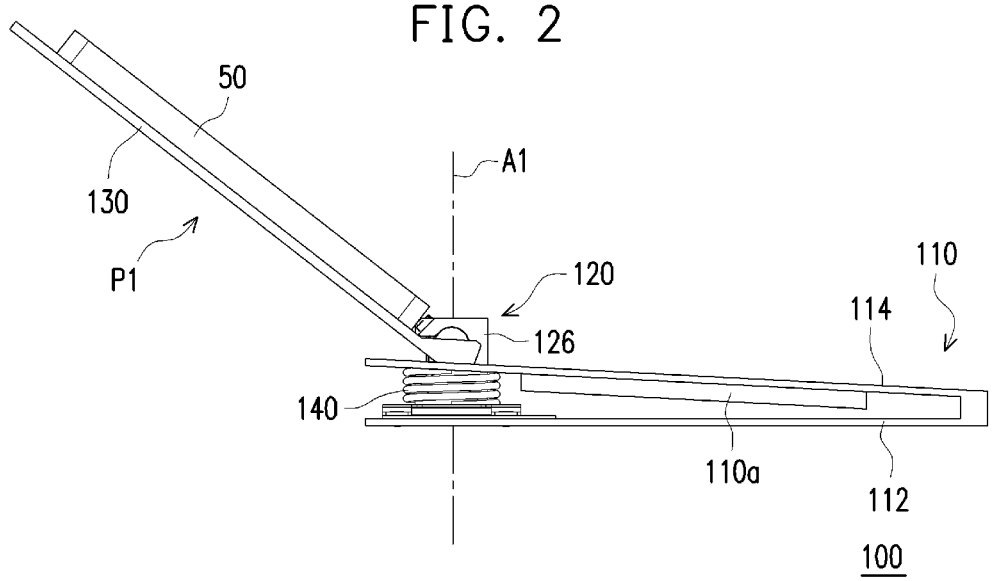
FIG. 3 is a side view of the docking station and the portable device of FIG. 2.

FIG. 1 is a three-dimensional view of a docking station according to an embodiment of the invention. FIG. 2 is a schematic view of the docking station collocated with a portable device of FIG. 1. FIG. 3 is a side view of the docking station and the portable device of FIG. 2. Referring to FIG. 1 and FIG. 3. A docking station 100 of the present embodiment is suitable for a portable device 50 and the portable device 50 is, for example, a tablet computer. The docking station 100 includes a base 110, a pivot assembly 120, a supporting board 130 and an elastic element 140. The base 110 includes a bottom plate 112 and a moving plate 114. The base 110 has an input interface 110a and the input interface 110a is, for example, a keyboard module and is disposed on the moving plate 114. The pivot assembly 120 is connected pivotally to the base 110 along a first axis A1. The supporting board 130 is pivotally connected to the pivot assembly 120 along a second axis A2 and adapted to support the portable device 50. The first axis A1 is, for example, vertical to the second axis A2.

Figure 4:
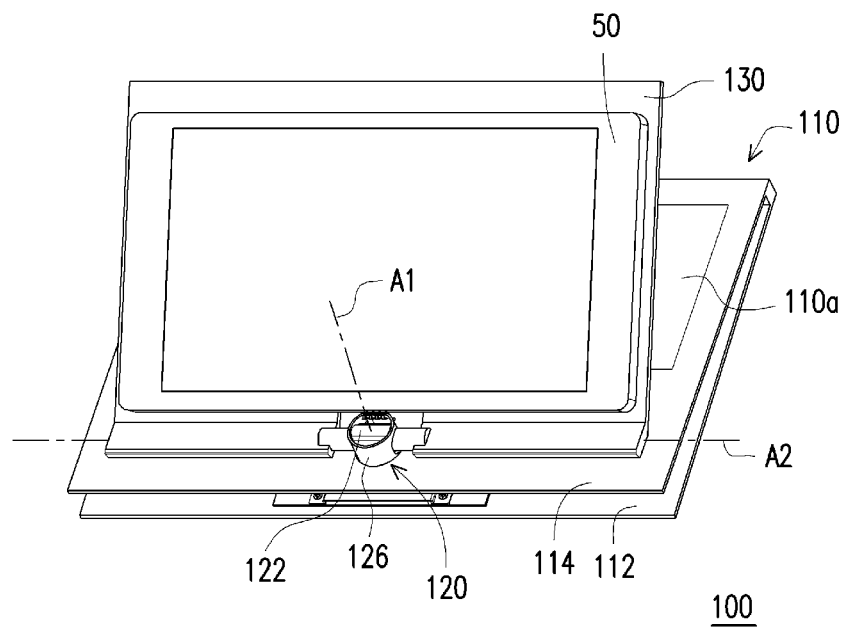
FIG. 4 is a schematic view of a pivot assembly and a supporting board rotating along a first axis of FIG. 1.
Figure 5:
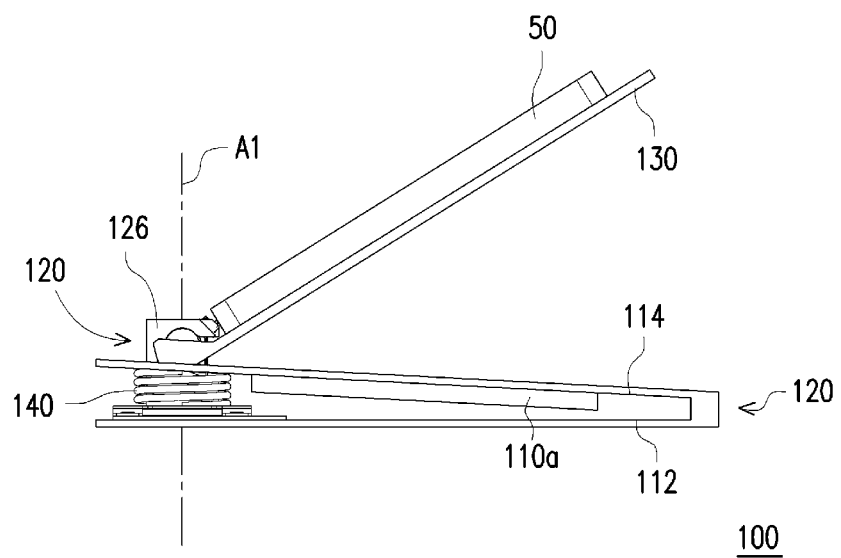
FIG. 5 is a side view of a docking station and a portable device of FIG. 4.

FIG. 4 is a schematic view of the pivot assembly and the supporting board rotating along the first axis of FIG. 1. FIG. 5 is a side view of the docking station and the portable device of FIG. 4. When the supporting board, as shown in FIG. 2 and FIG. 3, is located at a first position P1, the pivot assembly 120 is rotated along the first axis A1. Thus, the supporting board 130 rotates with the pivot assembly 120 relative to the base 110 along the first axis A1. The supporting board 130 can rotate along the first axis A1 from a state as shown in FIG. 2 and FIG. 3 to a state as shown in FIG. 4 and FIG. 5 so as to change facing directions of the portable device. When a user intends to operate the input interface 110a, the supporting board 130 can be adjusted into a state as shown in FIG. 2 and FIG. 3. At this time, the portable device 50 faces toward the input interface 110a and the user can view displayed pictures on the portable device 50 and operate the input interface 110a. When the user intends to view films with the portable device 50 but does not need to operate the input interface 110a, the supporting board 130 can be adjusted into a state as shown in FIG. 4 and FIG. 5. At this time, the portable device 50 faces backward to the input interface 110a, allowing the user to view displayed pictures on the portable device 50 more comfortably.

Figure 6A:
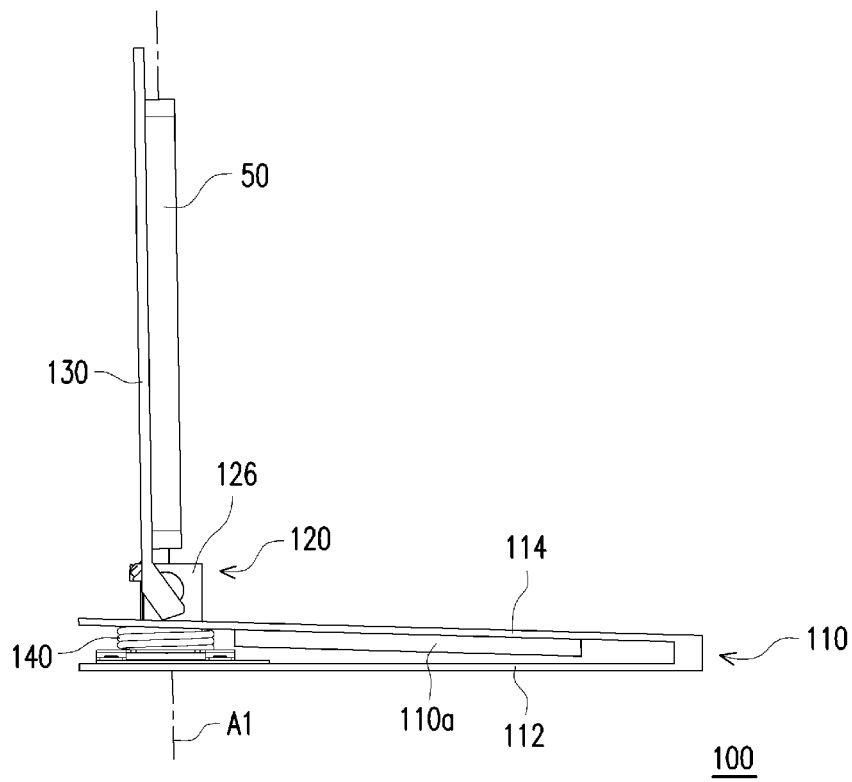
FIG. 6A and FIG. 6B are flow charts of a supporting board rotating along a second axis of FIG. 3.
Figure 6B:
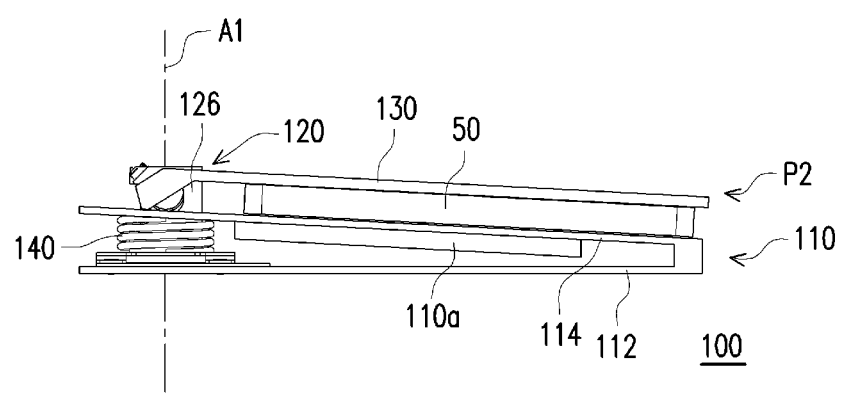
Figure 7:
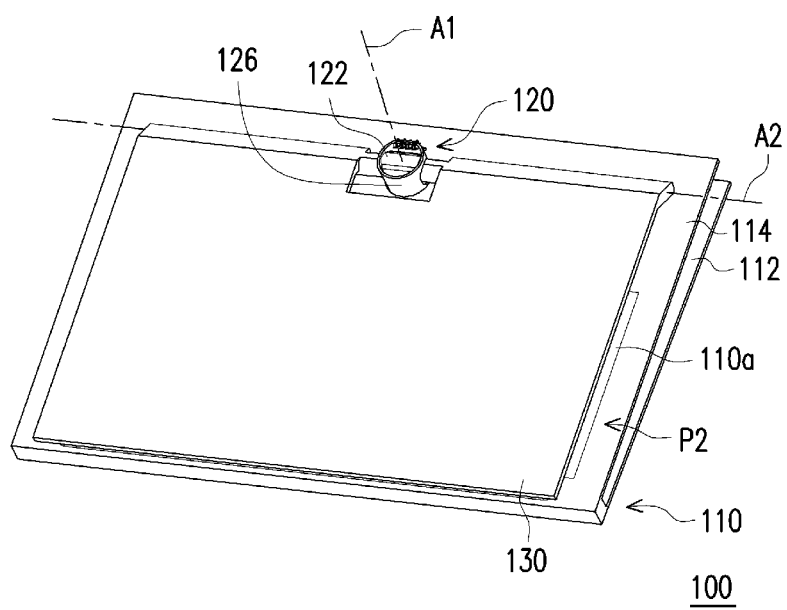
FIG. 7 is a three-dimensional view of a docking station and a portable device of FIG. 6B.

Referring to FIG. 3. The elastic element 140 is supported between the bottom plate 112 and the moving plate 114 to fix the supporting board 130 on the first position P1. At this time, the supporting board 130 and the portable device 50 are expanded from the base 110. FIG. 6A and FIG. 6B are flow charts of the supporting board rotating along the second axis of FIG. 3. FIG. 7 is a three-dimensional view of the docking station and the portable device of FIG. 6B. When the supporting board 130 is rotated along the second axis A2, the supporting board 130, as shown in FIG. 6A, pushes the moving plate 114 downward by resisting elastic force of the elastic element 140. Next, the supporting board 130 continues to rotate along the second axis A2 and move from the first position P1, as shown in FIG. 3, to the second position P2, as shown in FIG. 6B and FIG. 7.

When the supporting board 130 is located at the second position P2, the supporting board 130 and the portable device 50 are closed to the base 110. The elastic element 140 pushes the moving plate 114 against the supporting board 130 to fix the supporting board 130 on the second position P2 for the user to store or carry conveniently the portable device 50 and the docking station 100. When the user intends to unfold the portable device 50 from the base 110 as shown in FIG. 6B, the user applies forces to the supporting board 130 and make it rotate along the second axis A2 to a state as shown in FIG. 6A and push the moving plate 114 downward by resisting elastic forces of the elastic element 140. Next, the supporting board 130 continues to rotate along the second axis A2 and move from the second position P2, as shown in FIG. 6B and FIG. 7, to the first position P1, as shown in FIG. 3.

With the aforesaid disposition, the portable device 50 on the supporting board 130 can adopt to various habits or usages of different users by changing facing directions when the supporting board 130 is rotated or is unfolded/closed on the base 110, and thereby enhances flexibility and convenience of the portable device 50 used in collocation with the docking station 100. In addition, the docking station 100 pushes the moving plate 114 of the base 110 against the supporting board 130 via the elastic element 140 to fix the position for the supporting board 130, so that the portable device 50 can be fixed steadily on the supporting board 130. Users only need to apply forces to the supporting board 130 and make it push the moving plate 114 by resisting elastic forces of the elastic element 140 and rotate along the second axis A2. In this way, the supporting board 130 and the portable device 50 can be rotated from an unfolded state to a closed state or rotated from a closed state to an unfolded state. Therefore, it is more convenient in terms of using the device.

The bottom plate 112 and the moving plate 114 of the present embodiment are, for example, an integral structure. When the supporting board 130, as shown in FIG. 6A, pushes the moving plate 114, the moving plate 114 is moved relative to the bottom plate 112 via elastic deformation of the base 110.

In the aforementioned embodiment, the moving plate 114 is pushed against the supporting board 130 utilizing elastic forces of the elastic element 140 and the supporting board 130 pushes the moving plate 114 by resisting elastic forces of the elastic element 140 to rotate along the second axis A2. However, the invention is not limited thereto. In other embodiments, the bottom plate 112 can have a slot. The moving plate 114 is pivotally disposed on one side of the slot. When the supporting board 130 is rotated along the second axis A2 and pushes the moving plate 114, the moving plate 114 is pivotally rotated such that the supporting board 130 is partially located in the slot. Next, the supporting board 130 continues to rotate along the second axis A2 and moves to the second position P2 from the first position P1. In the present embodiment, the moving plate 114 is, for example, integrally connected to one side of the slot and pressed down by the supporting board 130 to return to the original position via elastic deformation. Under a condition that the moving plate 114 is capable of bouncing back to its original position by its own elastic deformation, the elastic element 140 is not needed. In addition, the moving plate 114 also can be disposed pivotally to one side of the slot via other means and the invention is not limited thereto.

Figure 8:
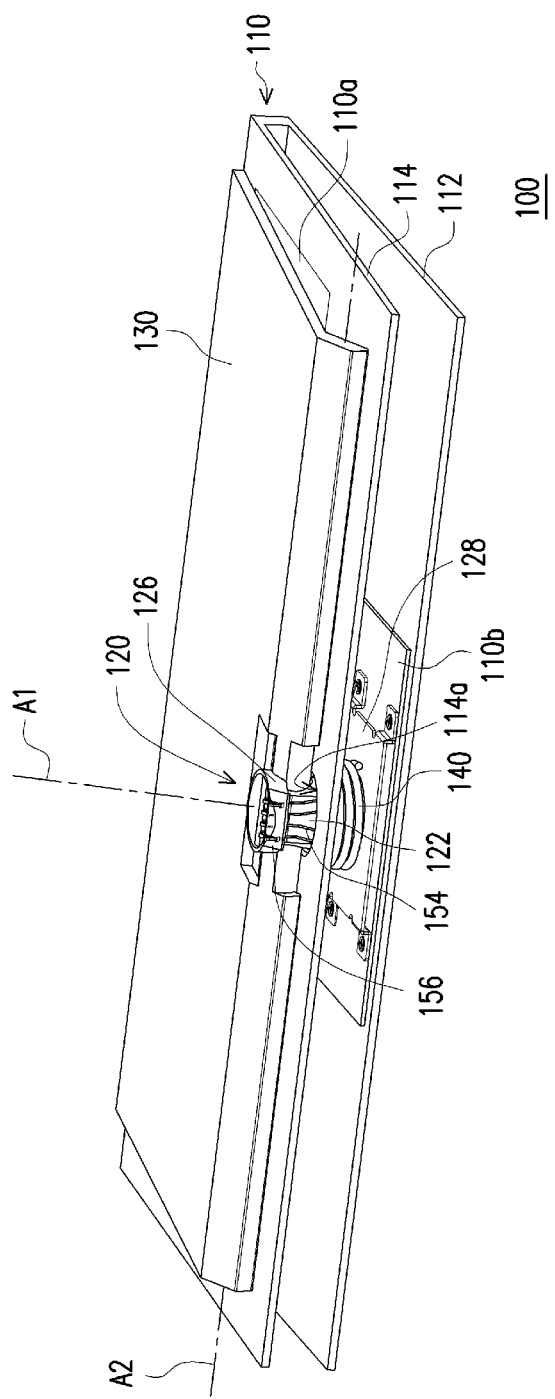
FIG. 8 is a three-dimensional view of the docking station from another angle of view of FIG. 7.
Figure 9:
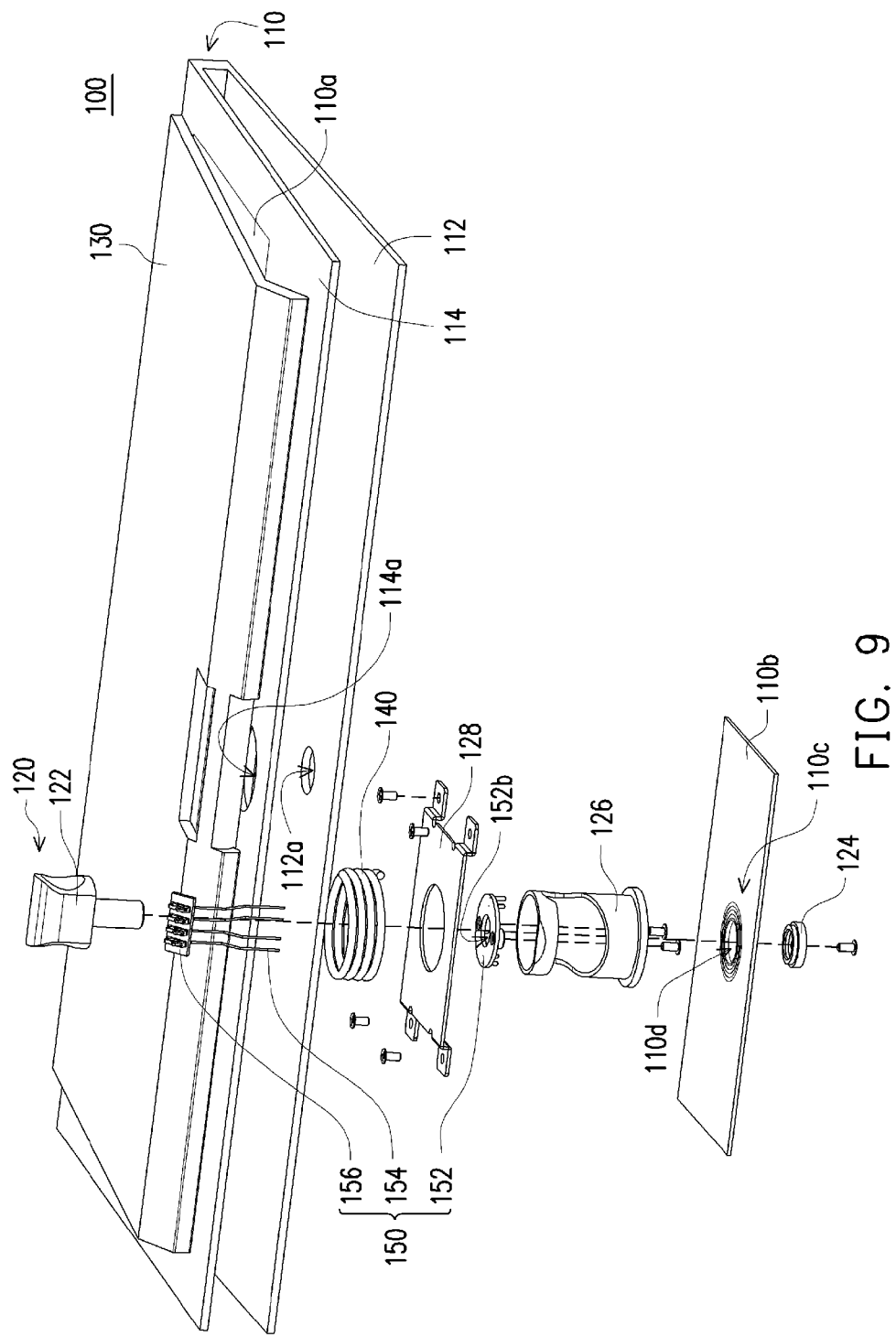
FIG. 9 is an explosive view of the docking station of FIG. 8.
Figure 10:
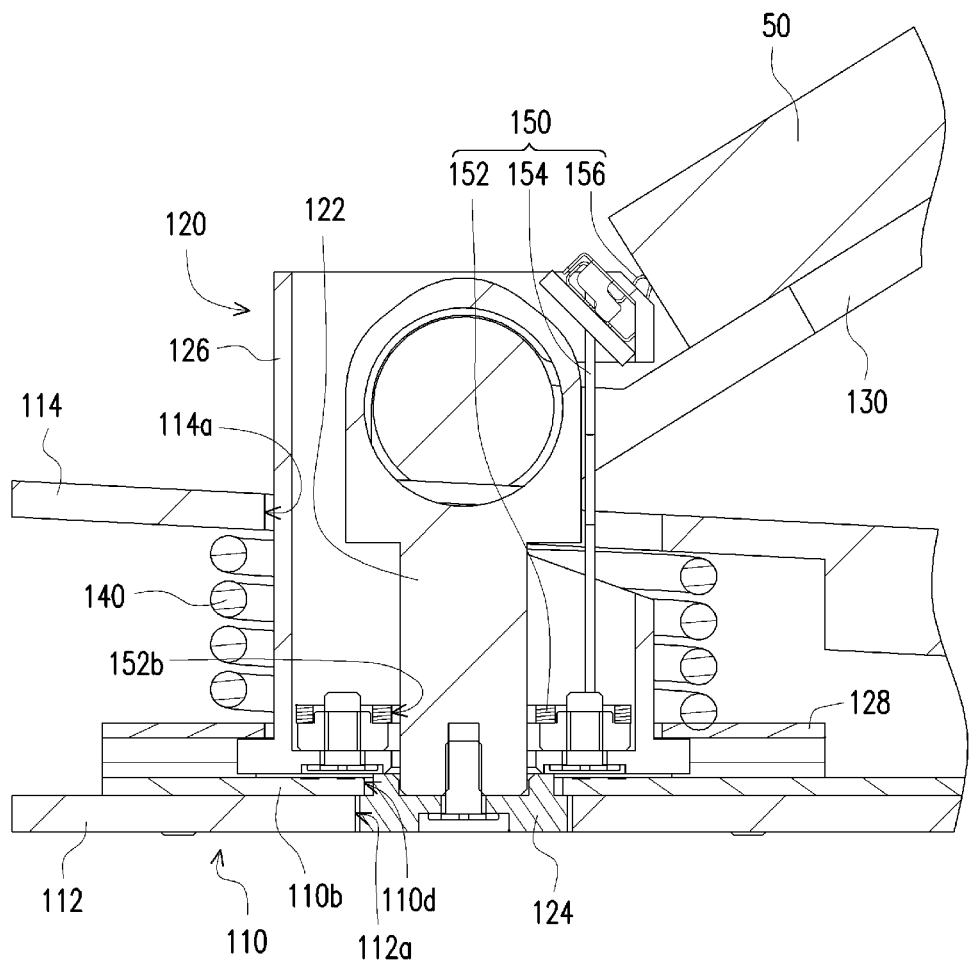
FIG. 10 is a partial cross-sectional view of the docking station of FIG. 5.

FIG. 8 is a three-dimensional view of the docking station from another angle of view of FIG. 7. FIG. 9 is an explosive view of the docking station of FIG. 8. FIG. 10 is a partial cross-sectional view of the docking station of FIG. 5. Referring to FIG. 8 and FIG. 10. The docking station 100 of the present embodiment further includes an electrical connection module 150. The base 110 has a circuit board 110b having a ring-shaped circuit 110c. The electrical connection module 150 includes an electrical connection component 152, a plurality of connecting terminals 154 and a connecting interface 156. The electrical connection component 152 is fixed on the pivot assembly 120 and contacted with the ring-shaped circuit 110c. The connecting terminals 154 are fixed on the pivot assembly 120 and connected to the electrical connection component 152. The connecting interface 156 is connected to the connecting terminals 154 and exposed by the pivot assembly 120. The portable device 50 is adapted to be electrically connected to the connecting terminals 154 via the connecting interface 156.

Figure 11:
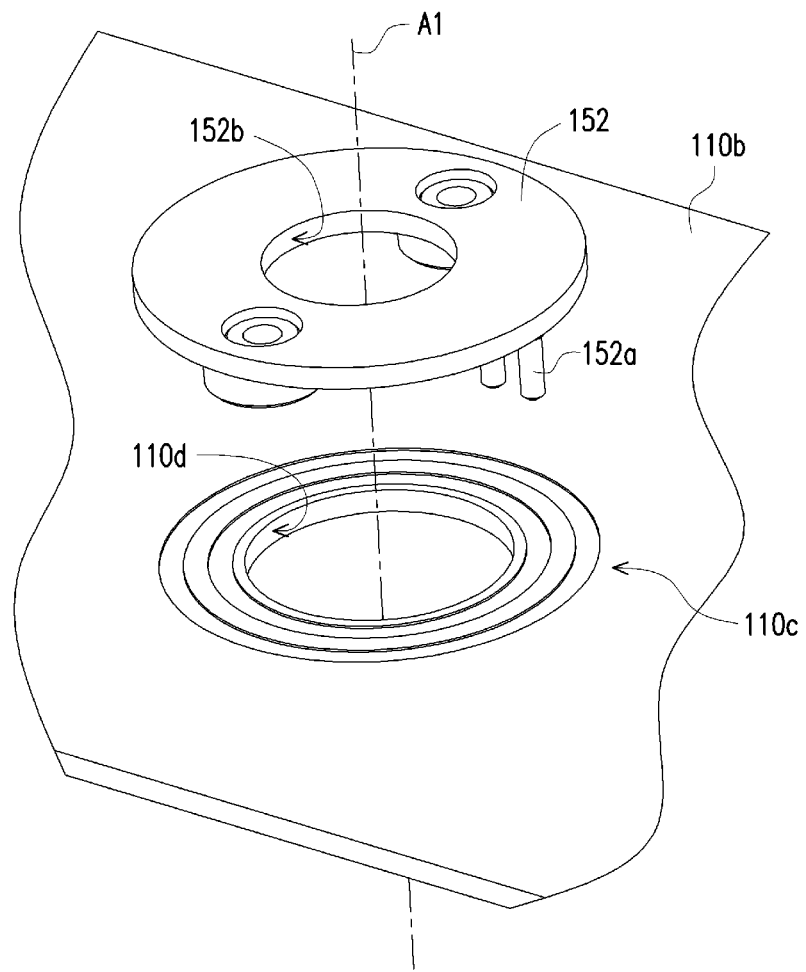
FIG. 11 is an enlarged view of a ring-shaped circuit and an electrical connection component of FIG. 9.
Figure 12:
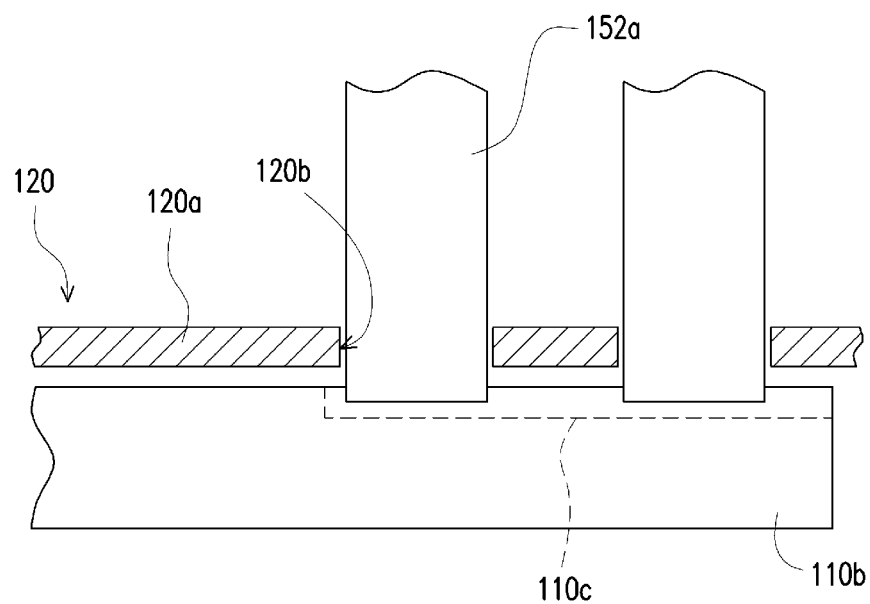
FIG. 12 is a schematic view of pogo pins contacting with the ring-shaped circuit of FIG. 11.

FIG. 11 is an enlarged view of the ring-shaped circuit and the electrical connection component of FIG. 9. FIG. 12 is a schematic view of the pogo pins contacting with the ring-shaped circuit of FIG. 11. Referring to FIG. 11 and FIG. 12. The electrical connection component 152 of the present embodiment is, for example, a pogo connector and has a plurality of pogo pins 152a. The electrical connection component 152 is contacted with the ring-shaped circuit 110c via the pogo pins 152a. When the supporting board 130 and the pivot assembly 120 as shown in FIG. 8 are rotated relative to the base 110 along the first axis A, the electrical connection component 152 following the pivot assembly 120 is rotated relative to the ring-shaped circuit 110c along the first axis A and continues to contact with the ring-shaped circuit 110c via the pogo pins 152a at the same time, so as to sustain electrical connection between the portable device 50 and the base 110.

In the present embodiment, the ring-shaped circuit 110c surrounds the first axis A1. In the process that the electrical connection component 152 and the pogo pins 152a rotating relative to the ring-shaped circuit 110c, the pogo pins 152a moves along a path surrounding the first axis A1 and maintains a state of contacting with the ring-shaped circuit 110c.

Referring to FIG. 8 and FIG. 10. The elastic element 140 of the present embodiment is, for example, a compression spring and is telescoped on the pivot assembly 120. The moving plate 114 has an opening 114a. The pivot assembly 120 is connected pivotally to the bottom plate 112 and protruded from the opening 114a to be connected pivotally to the supporting board 130. In addition, referring to FIG. 12, the pivot assembly 120 of the present embodiment has a bottom cap 120a having a plurality of holes 120b. The pogo pins 152a is contacted with the ring-shaped circuit 110c through the holes 120b.

Referring to FIG. 9 and FIG. 10. More specifically, the pivot assembly 120 of the present embodiment includes a pivot element 122, an assembly element 124, a sleeve 126 and a position-limiting element 128. The pivot element 122 is adapted to connect pivotally to the supporting board 130. The pivot element 122 and the assembly element 124 are respectively located on opposite sides of the circuit board 110b. The electrical connection component 152 has an aperture 152b. The pivot element 122 is extended to the assembly element 124 through the aperture 152b. The circuit board 110b has an aperture 110d. The assembly element 124 is fixed together with the assembly element 122 through the aperture 110d. The bottom plate 112 of the base 110 has an opening 112a. The assembly element 124 is disposed inside the opening 112a. The sleeve 126 covers the assembly element 122, the electrical connection component 152 and the connecting terminals 154. The position-limiting element 128 is fixed to the base 110 and restricts the position of the sleeve 126 on the base 110.

In view of the foregoing, the pivot assembly of the invention is pivotally connected to the base and the supporting board is pivotally connected to the pivot assembly, enabling the supporting board to rotate to a plurality of different positions relative to the base. Herewith, the portable device on the supporting board can adapt to various habits or usages of various users by changing facing directions when the supporting board is rotated or is unfolded/closed on the base, and thereby enhances flexibility and convenience of the portable device when used in collocation with the docking station. In addition, in the invention, the electrical connection component is disposed on the pivot assembly, wherein the electrical connection component is adapted to be contacted with the ring-shaped circuit of the base, and electrically connected to the portable device on the supporting board via connecting terminals. Herewith, when the supporting board and the pivot assembly are rotated relative to the base along the first axis, the electrical connection component following the pivot assembly is rotated relative to the ring-shaped circuit along the first axis and at the same time continues to be contacted with the ring-shaped circuit so as to sustain electrical connection between the portable device and the base. In addition, the moving plate of the base of the invention is pushed against the supporting board via the elastic element to fix the position of the supporting board, so that the portable device can be disposed steadily on the supporting board. Users only need to apply forces to the supporting board and make it push the moving plate by resisting elastic forces of the elastic element and rotate along the second axis. In this way, the supporting board and the portable device can be rotated from an unfolded state to a closed state or from a closed state to an unfolded state. Therefore, it is more convenient in terms of using the device.

Although the present invention has been described with reference to the above embodiments, it is not intended to limit the invention. It is apparent to one of the ordinary skill in the art that modifications to the described embodiments may be made without departing from the spirit of the invention. Accordingly, the scope of the invention will be defined by the attached claims and not by the above detailed descriptions.

What is claimed is:

1. A docking station suitable for a portable device, wherein the docking station comprises:
   a base comprising a circuit board, wherein the circuit board has a ring-shaped circuit;
   a pivot assembly connected pivotally to the base along a first axis;
   a supporting board connected to the pivot assembly and adapted to support the portable device, wherein the supporting board is rotated relative to the base when the pivot assembly is rotated along the first axis; and
   an electrical connection module comprising:
      an electrical connection component fixed on the pivot assembly and contacted with the ring-shaped circuit; and
      a plurality of connecting terminals fixed on the pivot assembly and connected to the electrical connection component, wherein the portable device is adapted to be connected to the connecting terminals.

2. The docking station as recited in claim 1, wherein the supporting board is pivotally connected to the pivot assembly along a second axis, the base comprises a bottom plate and a moving plate, and the docking station further comprises an elastic element, wherein the elastic element is supported between the bottom plate and the moving plate and pushes the moving plate against the supporting board to fix the supporting board to a first position, and when the supporting board is rotated along the second axis, the supporting board pushes the moving plate and moves from the first position to a second position by resisting elastic force of the elastic element.

3. The docking station as recited in claim 1, wherein the electrical connection component is a pogo connector and comprises a plurality of pogo pins.

4. The docking station as recited in claim 1, wherein the pivot assembly comprises:
   a pivot element connected pivotally to the supporting board; and
   an assembling element, wherein the pivot element and the assembling element are respectively located on opposite sides of the circuit board, and the circuit board has an aperture, and the assembling element is fixed together with the pivot element through the aperture.

5. The docking station as recited in claim 2, wherein the supporting board and the portable device are expanded from the base when the supporting board is located at the first position, and the supporting board and the portable device are closed on the base when the supporting board is located at the second position.

6. The docking station as recited in claim 2, wherein the moving plate is moved relative to the bottom plate via elastic deformation of the base when the supporting board pushes the moving plate.

7. The docking station as recited in claim 2, wherein the moving plate comprises an opening and the pivot assembly is connected pivotally to the bottom plate and protruded from the opening.

8. The docking station as recited in claim 2, wherein the elastic element is a compression spring and telescoped on the pivot assembly.

9. The docking station as recited in claim 1, wherein the base comprises an input interface.

10. The docking station as recited in claim 9, wherein the supporting board is rotated relative to the base and drives the portable device facing forward or backward to the input interface when the pivot assembly is rotated along the first axis.

11. The docking station as recited in claim 3, wherein the pivot assembly has a bottom cap having a plurality of holes and the pogo pins are contacted with the ring-shaped circuit through the holes.

12. The docking station as recited in claim 4, wherein the pivot assembly comprises a sleeve covering the pivot element, the electrical connection component and the connecting terminals.

13. The docking station as recited in claim 12, wherein the pivot assembly comprises a position-limiting element fixed on the base and restricting a position of the sleeve on the base.

14. A docking station suitable for a portable device, wherein the docking station comprises:
   a base comprising a bottom plate and a moving plate;
   a pivot assembly connected pivotally to the base along a first axis; and
   a supporting board connected pivotally to the pivot assembly along a second axis and adapted to support the portable device, wherein the pivot assembly is rotated along the first axis for the supporting board to rotate relative to the base when the supporting board is located at a first position, the supporting board pushes the moving plate and moves from the first position to a second position when the supporting board is rotated along the second axis, and when the supporting board pushes the moving plate, the moving plate moves relatively to the bottom plate.

15. The docking station as recited in claim 14, further comprising:
   an elastic element supported between the bottom plate and the moving plate to push the moving plate against the supporting board so as to fix the supporting board on the first position, wherein when the supporting board is rotated along the second axis, the supporting board pushes the moving plate and moves from the first position to the second position by resisting elastic force of the elastic element.

16. The docking station as recited in claim 14, wherein the bottom plate has a slot, the moving plate is pivotally connected to one side of the slot, and the supporting board pushes the moving plate and moves from the first position to the second position when the supporting board is rotated along the second axis.

17. The docking station as recited in claim 14, wherein the base comprises an input interface.

18. The docking station as recited in claim 14, wherein the supporting board and the portable device are expanded from the base when the supporting board is located at the first position, and the supporting board and the portable device are closed on the base when the supporting board is located at the second position.

19. The docking station as recited in claim 14, wherein the moving plate is moved relative to the bottom plate via elastic deformation of the base when the supporting board pushes the moving plate.

20. The docking station as recited in claim 14, wherein the moving plate comprises an opening and the pivot assembly is pivotally connected to the bottom plate and protruded from the opening.

21. The docking station as recited in claim 15, wherein the elastic element is a compression spring and telescoped on the pivot assembly.

22. The docking station as recited in claim 16, wherein when the supporting board pushes the moving plate, the moving plate is pivotally rotated such that the supporting board is partially located in the slot.

23. The docking station as recited in claim 17, wherein the supporting board is rotated relative to the base and drives the portable device facing forward or backward to the input interface when the pivot assembly is rotated along the first axis.

\* \* \* \* \*